ized to form or is provided with a lug 6,
UNITED STATES PATENT OFFICE.

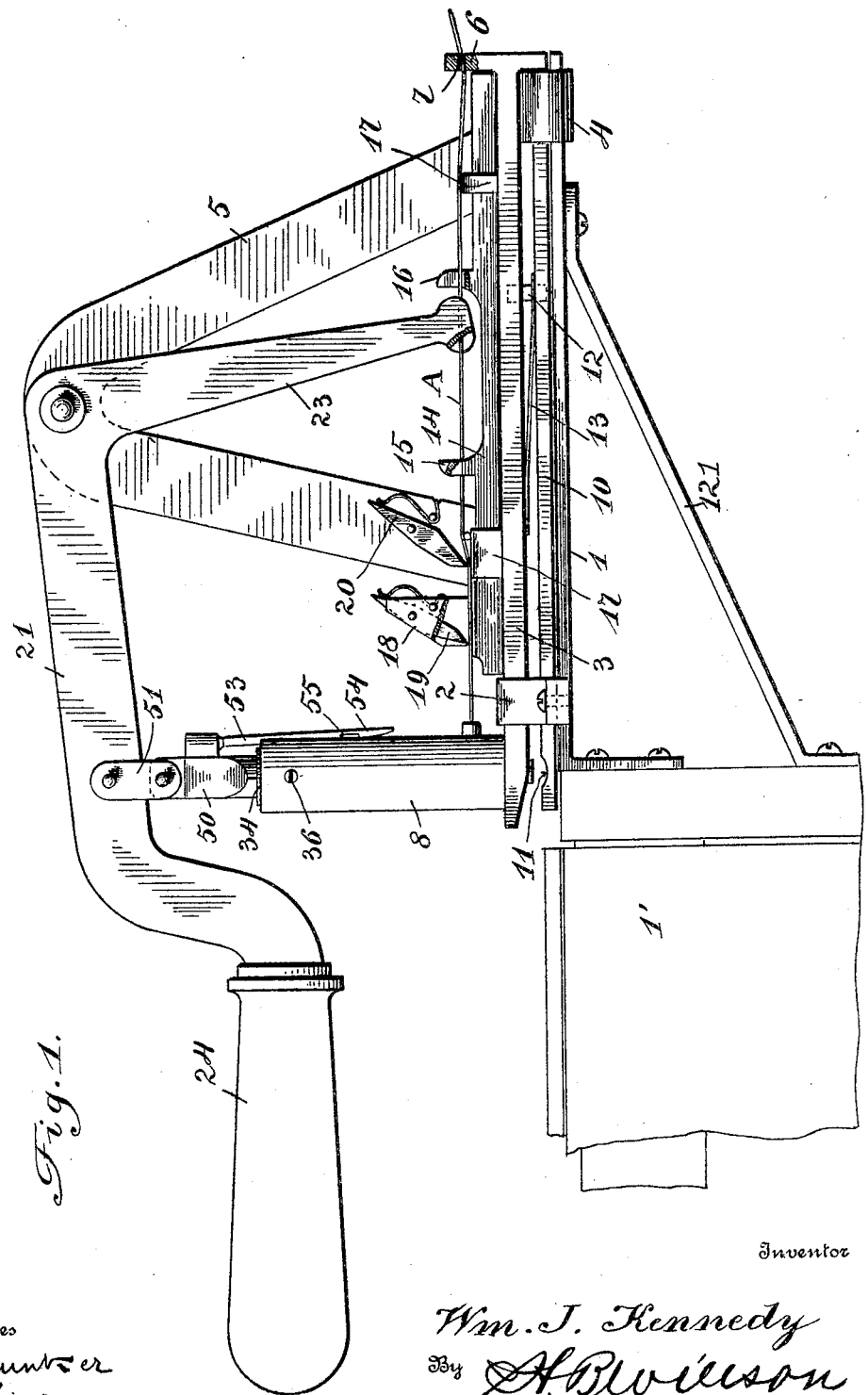

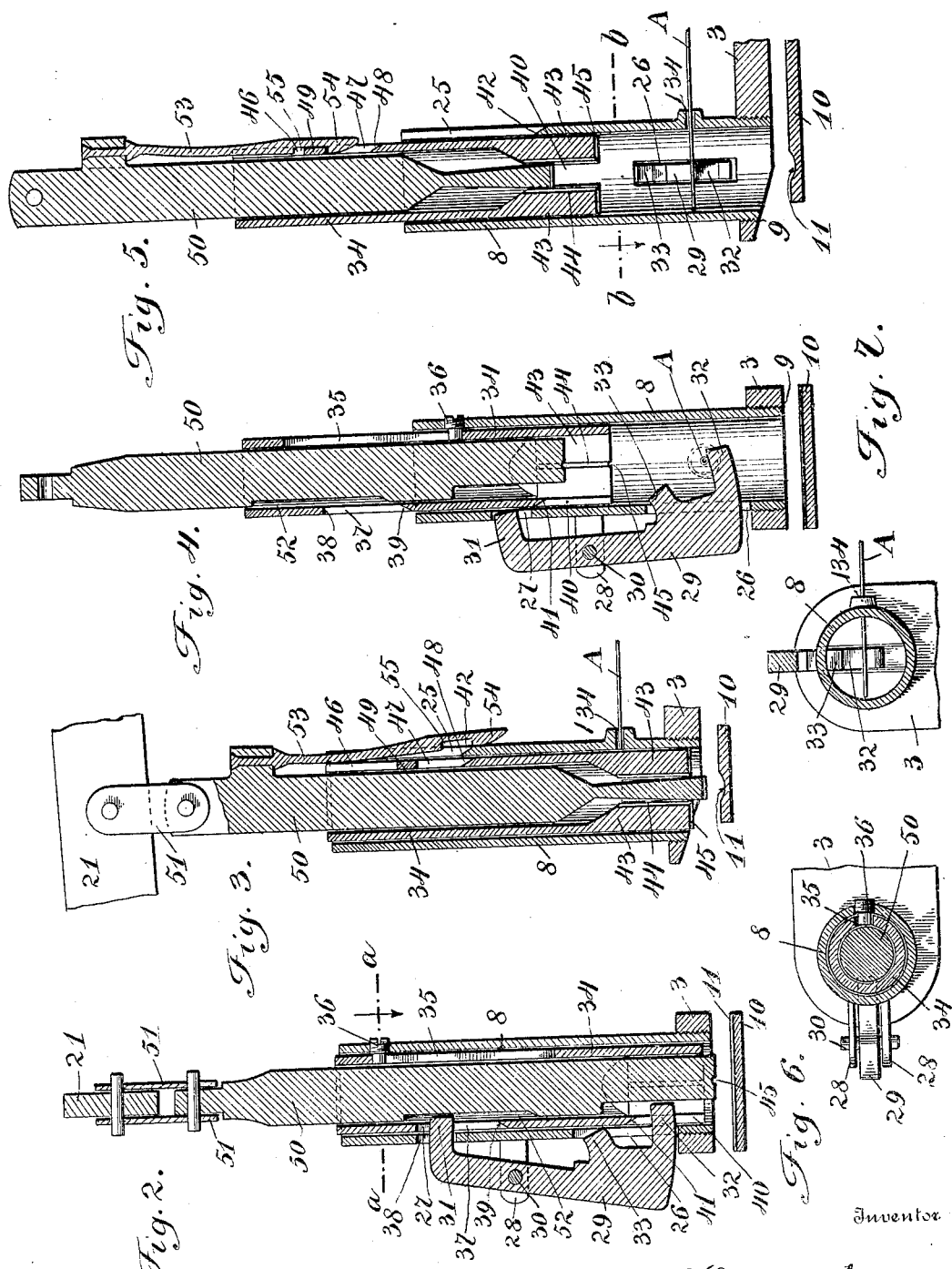

WILLIAM J. KENNEDY, OF ROCKISLAND, TEXAS.

STAPLING-MACHINE.

No. 804,864. Specification of Letters Patent. Patented Nov. 21, 1905.

Application filed June 13, 1904. Serial No. 212,414.

*To all whom it may concern:*

Be it known that I, WILLIAM J. KENNEDY, a citizen of the United States, residing at Rockisland, in the county of Colorado and State of Texas, have invented certain new and useful Improvements in Stapling-Machines; and I do declare the following to be a full, clear, and exact description of the invention, such as will enable others skilled in the art to which it appertains to make and use the same.

My invention is an improved stapling-machine especially adapted for use, in connection with a machine for making fruit and berry boxes, for fastening the parts of the fruit or berry boxes together; and it consists in the construction, combination, and arrangement of devices hereinafter described and claimed.

In the accompanying drawings, Figure 1 is a side elevation of a stapling-machine embodying my improvements, showing the same in connection with a machine for making fruit and berry boxes and with which it coöperates. Fig. 2 is a vertical sectional view of the stapling mechanism, taken on a plane at right angles to that of Fig. 3. Fig. 3 is a similar view of the same, taken on a plane at right angles to that of Fig. 2. Fig. 4 is a view similar to Fig. 2 and showing the operating parts in a different position. Fig. 5 is a view similar to Fig. 3 and showing the operative parts in a different position. Fig. 6 is a transverse sectional view taken on the plane indicated by the line *a a* of Fig. 2. Fig. 7 is a similar view taken on the plane indicated by the line *b b* of Fig. 5.

The machine for making fruit and berry boxes is indicated at 1 in Fig. 1. It forms no part of my present improvements and is already covered by Letters Patent of the United States No. 753,140, granted to me on the 23d day of February, 1904.

My improved stapling-machine hereinafter described is especially adapted for use, in connection with the box-making machine, for fastening the parts of the boxes together; but the stapling-machine is not limited to use in connection with the box-making machine, as it may be employed independently thereof.

A base or support for the stapling-machine is formed by a bracket-arm 1, here shown as attached to the upper end of the box-making machine and as braced by an inclined rod 121. Said base-arm is a metallic plate of rectangular form. On its upper side near its inner end are a pair of guides 2. A bar 3 is provided at one end with a pair of guides 4, which engage opposite sides of the base-plate 1 and serve to mount the said bar on the base-plate for longitudinal movement thereon. Said bar passes between and is also guided by the guides 2. On the upper side of the said bar 3 is a standard 5. One end of the said bar is upturned to form or is provided with a lug 6, which forms a stop and a wire-guide and is provided with an opening 7, through which the wire passes. At the opposite end of the said bar is a vertical tubular guide 8, which is here shown as cylindrical in form. The bore of the said tubular guide-cylinder registers with an opening 9 at the said end of the said bar. An arm 10, which is under the bar 3 and spaced therefrom, bears on and is adapted to slide upon the base-plate 1. Said arm 10 extends under the lower end of the guide-cylinder 8 and is provided with a transverse semicylindrical groove 11, which is in its upper side. The said arm 10 is connected by a pin or other suitable device 12 to the bar 3, and said bar is adapted to play angularly in a vertical plane, so that its free end, which carries the guide-cylinder 8, is adapted to move toward and from the arm 10. A spring 13, which is interposed between the bar 3 and the arm 10, serves to normally raise the free end of the said bar.

On the bar 3 is a reciprocating wire-feed bar 14. The same is provided on its upper side at a point between its ends with tappet-lugs 15 16, each of which is provided with a vertical longitudinal guide-slot, through which the wire passes. The said wire-feed bar travels in guides 17 and is provided near one end, which I will term its "inner" end, with a pair of lugs 18, which rise therefrom and between which is pivoted a spring-pressed gripping-dog 19, which is normally closed toward the wire-feed rod and normally bears upon the wire, so as to secure the wire on the said feed-rod for movement longitudinally by the latter. A spring-pressed wire-gripping dog 20 is pivoted to the standard 5 and coacts with one of the guides 17 to engage the wire to hold the latter while the bar 14 is moving outward, and thereby prevent the wire from moving in that direction with the said feed-bar. It will be understood that the gripping-dog 19 causes the wire to be fed by the inward longitudinal movement of the reciprocating wire-feed bar. The latter is operated by a lever 21, that has an operating-arm 23, which moves back and forth between the lugs 15 16 and alternately engages them, so that when the said lever is oscillated the said wire-feed bar 14 is given intermittent reciprocating motion in order to feed the wire, as will be understood. Said lever 21 is here shown as provided with a handle 24, which enables said lever to be readily operated manually.

In the rear side of the guide-cylinder 8, at the upper end thereof, is a vertical guide-slot 25. At right angles to the said guide-slot is an opening 26, which is in one side of the guide-cylinder, near the lower end thereof, and a suitable distance above the said opening 26 is an opening 27. Between the openings 26 27 are a pair of lugs or ears 28, which project from the guide-cylinder. A staple-bending bar 29 is pivoted, as at 30, between the said lugs or ears 28. Its upper end is provided with a tappet-arm 31, which is adapted to enter and move outwardly from the guide-cylinder through the opening 27. At the lower end of the bending-bar 29 is a bending-arm 32, which is adapted to enter and to move outwardly from the guide-cylinder through the lower portion of the opening 26. Above the said bending-arm and at a suitable distance therefrom is a tappet-arm 33, which is adapted to enter and move outwardly from the cylinder through the upper portion of the opening 26. In the rear side of the said guide-cylinder, near the lower end thereof, is a feed-opening 134, through which the wire passes. The wire is indicated at A. In the guide-cylinder 8 is a cylindrical wire-cutting and staple-forming sleeve 34. The same is provided in one side with a vertical slot 35, in which operates the inner end of a screw-stud 36, which passes through one side of the guide-cylinder 8. The said stud and slot cooperate to limit the vertical movement of the cutting and forming sleeve 34 in the said guide-cylinder. In the side of the sleeve 34 opposite the stud 36 and near the upper end of the said sleeve is a vertical opening 37, the upper end of which forms a stop-shoulder 38 and the lower end of which is outwardly inclined to form a cam 39. The said opening 37 is disposed opposite to and registers with the opening 27 of the guide-cylinder. At the lower end of the said cutting and forming sleeve and on the same side with the opening 37 is a vertical opening 40, at the upper end of which is a cam 41, which is reversely inclined with reference to the cam 39. The lower end of the guide-slot 25 is formed by an outwardly and downwardly inclined surface 42. In opposite sides of the cutting and forming sleeve, at the lower end thereof, are jaw-blocks or shoulders 43, each of which has at its center a vertical groove 44, which communicates with a lateral groove 45 at the lower end of the cutting and forming sleeve. In the rear side of the latter at its upper end is an opening 46, and below the said opening 46 is an opening 47, the lower side of which is formed by a downwardly and outwardly inclined cam-surface 48. The space between the said openings forms a stop 49.

In the cutting and forming sleeve, which is adapted for step-by-step vertical reciprocating motion in the guide-cylinder 8, is a punch 50, the upper end of which is connected by links 51 to the lever 21. The lower end of the punch is adapted to operate between jaws 43. The said punch has on one side at a suitable distance between its upper and lower ends a notch 52, which is of suitable length and is disposed opposite the opening 37 in the cutting and forming sleeve. On the rear side of the punch and connected thereto at its upper end is a spring locking-arm 53, the lower end of which forms a cam-hook 54 and on the inner side of which at a suitable distance from its lower end is a stop-notch 55, which is adapted to be engaged by the stop 49 of the cutting and forming sleeve 34.

In the operation of my improved stapling-machine the lever 21 at each upstroke thereof causes the feed-bar 14 to move inwardly and to feed the wire A to the guide-cylinder, so that the end of the wire is disposed across the said cylinder below the lower ends of the punch and the cutting and forming sleeve and above the bending-arm 32 of the pivoted bending-bar 29. At the end of the upstroke of the lever the punch is in its most elevated position, its locking-arm has its notch 55 engaged with the stop 49 of the cutting and forming sleeve, so that the latter is raised therewith, the end of the tappet-arm 31 of the bending-bar is opposite that portion of the said sleeve between the openings 37 and 40, and the tappet-arm 33 of the bending-bar is by the inclined position of the latter brought in the path of the cam 41 at the upper end of the opening 40. At the ensuing downstroke of the lever the punch is moved downwardly, carrying the cutting and forming sleeve with it by reason of the engagement of the stop 49 with the notch 55 of the locking-arm. This simultaneous downward movement of the punch and the cutting and forming sleeve continues until the wire which lies across the guide-cylinder and above the bending-arm 32 of the bending-bar is cut off and bent to form a staple with its points extending downwardly, at which time the end of the tappet-arm 31 is opposite the opening 37 in the cutting and forming sleeve and the recess 52 in the punch and the tappet-arm 33 is engaged by the cam 41, thereby turning the bending-bar on its pivot, so as to withdraw its bending-arm 32 from the staple and to clear the path of the cutting and forming sleeve and the punch, this movement of the bending-bar causing its upper tappet-arm 31 to enter the opening 37 of the cutting and forming sleeve and the recess 52 of the punch. The staple is carried downwardly by the cutting and forming sleeve and by the punch, and the work being between the inner ends of the bar 3 and the clenching-arm 10 the cutting and forming sleeve carries the staple to the work and presents its points thereto. The downward movement of the cutting and forming sleeve is then arrested by the engagement of the stop-stud 36 with the upper end of the slot 35. Just before this instant the cam-point 54 of the spring locking-arm engages the cam 42 at the lower end of the slot 25, and said locking-arm is caused by the coaction of the said cams and the continued movement of the punch to be moved outwardly at its lower end to disengage its notch 55 from the stop 49 of the cutting and forming sleeve, thereby releasing the punch from the former, the final downward movement of the punch serving to drive the points of the staple through the work and to clench them against the groove in the upper side of the clenching-arm. Owing to the angular movement of the bar 3, which carries the staple forming and driving mechanism, with relation to the clenching-arm, said bar bears firmly on and holds the work while the staple is being driven therethrough. The arm 23 of the lever moves idly between the tappet-lugs of the wire-feed bar, owing to the extent of the space between them, until near the limits of the stroke of the lever, the said arm and tappet lugs coacting to move the wire-feed bar back and forth at the ends of the stroke of the lever to properly feed the wire to the staple-forming mechanism.

The sliding movement of the stapling mechanism on the bracket-plate 1 enables the same to be moved manually by the operator into and out of engagement with the work as the boxes are formed by the box-making machine.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a staple forming and driving mechanism, the combination of a tubular guide element, an oscillating bending-bar element mounted on one side of the said guide element and having lateral arms on its inner side, said guide element having openings in one side through which said arms extend, and being further provided with a slot 25 and a cam 42, a tubular reciprocating cutting and forming element in said tubular guide element having slots in one side to clear the arms of the bending-bar element, mechanism at the inner ends of said slots to coact with said arms, and further provided with slots 46, 47, a stop 49 between them, and a cam 48 at the inner end of slot 47, a reciprocating punch in the said cutting and forming element, and a spring locking-arm secured to the punch, operating in the slot 25 of the tubular guide element and having a cam-hook 54 and a stop-notch 55, for the purposes set forth.

In testimony whereof I have hereunto set my hand in presence of two subscribing witnesses.

WILLIAM J. KENNEDY.

Witnesses:
WM. K. WALL,
W. A. SMALL.